(12) United States Patent
Shin

(10) Patent No.: US 11,972,752 B2
(45) Date of Patent: Apr. 30, 2024

(54) METHOD FOR DETECTING SPEECH SEGMENT FROM AUDIO CONSIDERING LENGTH OF SPEECH SEGMENT

(71) Applicant: ActionPower Corp., Seoul (KR)

(72) Inventor: Dongchan Shin, Seoul (KR)

(73) Assignee: ActionPower Corp., Seoul (KR)

( * ) Notice: Subject to any disclaimer, the term of this patent is extended or adjusted under 35 U.S.C. 154(b) by 0 days.

(21) Appl. No.: 17/979,715

(22) Filed: Nov. 2, 2022

(65) Prior Publication Data

US 2024/0078998 A1  Mar. 7, 2024

(30) Foreign Application Priority Data

Sep. 2, 2022 (KR) .......... 10-2022-0111448

(51) Int. Cl.
| | | |
|---|---|---|
| *G10L 15/05* | (2013.01) | |
| *G10L 15/16* | (2006.01) | |
| *G10L 15/197* | (2013.01) | |
| *G10L 15/22* | (2006.01) | |
| *G10L 25/78* | (2013.01) | |

(52) U.S. Cl.
CPC ............ *G10L 15/05* (2013.01); *G10L 15/197* (2013.01); *G10L 15/22* (2013.01); *G10L 25/78* (2013.01); *G10L 15/16* (2013.01)

(58) Field of Classification Search
CPC ....... G10L 15/05; G10L 15/197; G10L 15/22; G10L 25/78; G10L 15/16
USPC ........................................................ 704/240
See application file for complete search history.

(56) References Cited

U.S. PATENT DOCUMENTS

| | | | | |
|---|---|---|---|---|
| 4,484,344 A | * | 11/1984 | Mai .......................... | G10L 25/78 |
| | | | | 704/E11.003 |
| 6,324,509 B1 | | 11/2001 | Bi et al. | |
| 7,437,286 B2 | * | 10/2008 | Pi ........................... | G01S 13/933 |
| | | | | 704/E15.04 |
| 9,373,343 B2 | * | 6/2016 | Dickins .................... | G10L 25/78 |
| 9,807,646 B1 | * | 10/2017 | Jorgavanovic ............ | H04L 1/00 |
| 9,953,661 B2 | | 4/2018 | Vickers | |
| 10,020,075 B2 | * | 7/2018 | Perlman ................. | A61B 5/447 |
| 10,134,425 B1 | * | 11/2018 | Johnson, Jr. ............. | G10L 25/87 |
| 10,872,620 B2 | * | 12/2020 | Fan .......................... | G10L 25/84 |
| 10,937,448 B2 | * | 3/2021 | Li ............................ | G10L 15/22 |

(Continued)

FOREIGN PATENT DOCUMENTS

| | | |
|---|---|---|
| JP | 2003-524794 A | 8/2003 |
| JP | 2010-257425 A | 11/2010 |

(Continued)

OTHER PUBLICATIONS

Korean Office Action with Translation for Application No. 10-2022-0111448, dated Nov. 4, 2022.

(Continued)

*Primary Examiner* — Thuykhanh Le
(74) *Attorney, Agent, or Firm* — MARSHALL, GERSTEIN & BORUN LLP

(57) ABSTRACT

Disclosed is a method for detecting a speech segment, which is performed by a computing device. The method may include: detecting a start point of a speech segment in an audio signal; and detecting an end point of the speech segment based on an offset threshold which is dynamically changed, and the dynamically changed offset threshold may be based on a length of the speech segment.

11 Claims, 8 Drawing Sheets

(56) References Cited

U.S. PATENT DOCUMENTS

| | | | |
|---|---|---|---|
| 11,341,988 B1* | 5/2022 | Pishehvar | G10L 25/30 |
| 11,538,461 B1* | 12/2022 | Gupta | G10L 15/16 |
| 11,574,637 B1* | 2/2023 | Kumar | G10L 15/22 |
| 11,610,610 B1* | 3/2023 | Vajpayee | G11B 27/10 |
| 2006/0111901 A1* | 5/2006 | Woo | G10L 25/78 704/E11.003 |
| 2009/0076814 A1 | 3/2009 | Lee | |
| 2011/0071823 A1* | 3/2011 | Iwasawa | G10L 25/78 704/E15.001 |
| 2011/0238417 A1* | 9/2011 | Yamamoto | G10L 25/78 704/E15.04 |
| 2012/0078397 A1* | 3/2012 | Lee | G10L 25/78 700/94 |
| 2012/0215536 A1* | 8/2012 | Sehlstedt | G10L 25/18 704/246 |
| 2015/0179187 A1* | 6/2015 | Xiao | G10L 25/00 704/270 |
| 2015/0320332 A1* | 11/2015 | Lee | A61B 5/6803 600/545 |
| 2015/0331490 A1* | 11/2015 | Yamada | G06F 3/017 345/156 |
| 2015/0348548 A1* | 12/2015 | Piernot | G10L 15/26 704/235 |
| 2015/0371633 A1* | 12/2015 | Chelba | G10L 15/063 704/240 |
| 2016/0260426 A1 | 9/2016 | Kim et al. | |
| 2016/0368264 A1* | 12/2016 | Osakabe | B41J 2/16526 |
| 2017/0256270 A1* | 9/2017 | Singaraju | G10L 25/21 |
| 2017/0300990 A1* | 10/2017 | Tanaka | G10L 15/08 |
| 2018/0033428 A1* | 2/2018 | Kim | G10L 21/0208 |
| 2018/0068677 A1* | 3/2018 | Suzuki | G10L 25/78 |
| 2019/0049942 A1* | 2/2019 | Dusane | G10L 15/22 |
| 2019/0108837 A1* | 4/2019 | Christoph | G06F 3/165 |
| 2019/0318721 A1* | 10/2019 | Tadpatrikar | G10L 15/26 |
| 2020/0027462 A1 | 1/2020 | Wang et al. | |
| 2020/0058320 A1* | 2/2020 | Liu | G10L 15/22 |
| 2020/0193987 A1* | 6/2020 | Minkin | G10L 25/30 |
| 2020/0251117 A1* | 8/2020 | Xu | G10L 25/51 |
| 2020/0327890 A1* | 10/2020 | Saito | G10L 15/07 |
| 2020/0359104 A1* | 11/2020 | Luo | H04N 21/4884 |
| 2020/0365138 A1 | 11/2020 | Kim et al. | |
| 2020/0402499 A1* | 12/2020 | Angkititrakul | G10L 25/84 |
| 2021/0074290 A1* | 3/2021 | Choi | G10L 15/22 |
| 2021/0127048 A1* | 4/2021 | Shimizu | H04N 23/64 |
| 2021/0134278 A1* | 5/2021 | Iwase | G06N 7/01 |
| 2021/0158824 A1* | 5/2021 | Jo | G10L 15/22 |
| 2021/0295833 A1* | 9/2021 | Rastrow | G10L 15/1815 |
| 2021/0319787 A1* | 10/2021 | Itoh | G06F 40/289 |
| 2021/0358490 A1* | 11/2021 | Vaidya | G10L 15/22 |
| 2021/0374326 A1* | 12/2021 | Mossoba | H04L 51/046 |
| 2022/0076023 A1* | 3/2022 | Shin | G06F 18/231 |
| 2022/0147722 A1* | 5/2022 | Kim | G10L 17/18 |
| 2022/0165289 A1* | 5/2022 | Stone | G10L 25/51 |
| 2022/0180859 A1* | 6/2022 | Park | G10L 15/07 |
| 2022/0180894 A1* | 6/2022 | Sha | G10L 25/78 |
| 2022/0189464 A1* | 6/2022 | Krishnaswamy | G10L 15/187 |
| 2022/0246167 A1* | 8/2022 | Vaidya | G10L 25/78 |
| 2022/0262392 A1* | 8/2022 | Hanazawa | G10L 25/84 |
| 2022/0270637 A1* | 8/2022 | Masumura | G10L 25/87 |
| 2022/0270638 A1* | 8/2022 | Zhang | G10L 25/78 |
| 2022/0310077 A1* | 9/2022 | Tu | G10L 15/32 |
| 2022/0310095 A1* | 9/2022 | Gao | G06F 3/167 |
| 2022/0335939 A1* | 10/2022 | Liscombe | G10L 25/93 |
| 2022/0357915 A1* | 11/2022 | Iwase | G06F 3/167 |
| 2022/0366905 A1* | 11/2022 | Smarr | G10L 15/1815 |
| 2023/0061929 A1* | 3/2023 | Carbune | H04L 63/0861 |
| 2023/0077245 A1* | 3/2023 | Shim | G10L 25/78 |
| 2023/0082094 A1* | 3/2023 | Keret | G10L 17/04 726/2 |
| 2023/0107450 A1* | 4/2023 | Chang | G10L 15/063 704/240 |
| 2023/0306966 A1* | 9/2023 | VanBlon | G10L 15/22 704/275 |
| 2023/0329630 A1* | 10/2023 | Patel | G16H 40/20 |

FOREIGN PATENT DOCUMENTS

| | | |
|---|---|---|
| KR | 100930584 B1 | 12/2009 |
| KR | 100933895 B1 | 12/2009 |
| KR | 101552660 B1 | 9/2015 |
| KR | 101805976 B1 | 12/2017 |
| KR | 101877127 B1 | 7/2018 |
| KR | 10-2020-0063984 A1 | 6/2020 |
| KR | 102136700 B1 | 7/2020 |
| KR | 102335717 B1 | 12/2021 |
| KR | 10-2022-0071523 A | 5/2022 |
| KR | 102410392 B1 | 6/2022 |

OTHER PUBLICATIONS

Korean Notice of Allowance with Translation for Application No. 10-2022-0111448, dated Mar. 27, 2023.

* cited by examiner

METHOD FOR DETECTING SPEECH SEGMENT FROM AUDIO CONSIDERING LENGTH OF SPEECH SEGMENT

CROSS-REFERENCE TO RELATED APPLICATIONS

This application claims priority to and the benefit of Korean Patent Application No. 10-2022-0111448 filed in the Korean Intellectual Property Office on Sep. 2, 2022, the entire contents of which are incorporated herein by reference.

TECHNICAL FIELD

The present disclosure relates to a method for detecting a speech segment, and more particularly, to a technology that detects a speech segment in a voice activity detection (VAD) process.

BACKGROUND

Voice activity detection (VAD) is a technique that judges whether a voice activity is detected from an audio stream. In general, a pipeline of the voice activity detection (VAD) performs a task of distinguishing whether a person pronounces (1) every short speech segment (e.g., 0.01 s) and whether the short speech segment is not a part where the person pronounces (0) with a probability value for a frame-specific voice of a voice activity detection (VAD) model, and since a frame unit is very short unlike a general classification model, it is not easy that a consecutive segment is made when discrimination is performed based on one threshold.

Korean Patent Registration No. 10-2136700 (Jul. 16, 2020) discloses a VAD apparatus and method based on tone counting

SUMMARY

The present disclosure has been made in an effort to improve speech to text (STT) performance by adjusting a segment with an appropriate length for speech to text (STT) in a voice activity detection (VAD) process (or a smoothing after VAD). For example, the present disclosure has been made in an effort to improve speech to text (STT) performance by generating a speech segment having a length to assist the speech to text (STT) in the future when performing the voice activity detection (VAD).

Meanwhile, a technical problem to be solved by the present disclosure is not limited to the above-mentioned technical problem, and various technical problems can be included within the scope which is apparent to those skilled in the art from contents to be described below.

An exemplary embodiment of the present disclosure provides a method performed by a computing device. The method may include: detecting a start point of a speech segment in an audio signal; and detecting an end point of the speech segment based on an offset threshold which is dynamically changed, and the dynamically changed offset threshold may be based on a length of the speech segment.

Alternatively, the detecting of the start point of the speech segment in the audio signal may include determining, when a probability that a specific frame of the audio signal will correspond to a speech is more than an onset threshold, the specific frame as the start point.

Alternatively, the dynamically changed offset threshold may be smaller than the onset threshold.

Alternatively, the detecting of the end point of the speech segment may include a step of calculating probabilities that subsequent frames after the specific frame will correspond to the speech, and when the probability that the specific subsequent frame will correspond to the speech is lower than the offset threshold, a step of determining a just previous frame of the specific subsequent frame as the end point.

Alternatively, the dynamically changed offset threshold may be changed based on the number of frames between the start point and a judgment target point.

Alternatively, the dynamically changed offset threshold may increase in proportion to the number of frames between the start point and the judgment target point.

Alternatively, the method may further include detecting a plurality of speech segments in the audio signal, and merging some of the plurality of detected speech segments.

Alternatively, the merging of some of the plurality of detected speech segments may include calculating intervals among the plurality of detected speech segments, identifying an interval of the calculated intervals, which is less than a merge-reference threshold, and merging speech segments associated with the identified interval.

Alternatively, the method may further include clipping the merged speech segment when a length of the merged speech segment is more than a clip-reference threshold.

Alternatively, the clipping of the merged speech segment may include identifying a boundary of original speech segments before merging with respect to the merged speech segment, and clipping the merged speech segment based on one boundary among the boundaries of the identified original speech segments.

Alternatively, the clip-reference threshold may be determined based on an input unit of the speech to text (STT) model.

Another exemplary embodiment of the present disclosure provides a computer program stored in a computer-readable storage medium. The computer program allows one or more processors to execute the following operations for detecting a speech segment when the computer program is executed by one or more processors, and the operations may include: detecting a start point of a speech segment in an audio signal; and detecting an end point of the speech segment based on an offset threshold which is dynamically changed, and the dynamically changed offset threshold may be based on a length of the speech segment.

Still another exemplary embodiment of the present disclosure provides a computing device. The device may include at least one processor; and a memory, and at least one processor may be configured to detect a start point of a speech segment in an audio signal, and detect an end point of the speech segment based on an offset threshold which is dynamically changed, and the dynamically changed offset threshold is based on a length of the speech segment.

According to an exemplary embodiment of the present disclosure, a voice activity detection (VAD) technique capable of enhancing speech to text (STT) performance can be provided. For example, according to an exemplary embodiment of the present disclosure, voice activity detection (VAD) is performed by using two thresholds to segment a result of the VAD to be appropriately long without segmenting the result of the VAD to be excessively short. Further, according to an exemplary embodiment of the present disclosure, it is possible to prevent an excessively long original VAD segment from being generated by utilizing a dynamic offset threshold. Further, according to an exemplary embodiment of the present disclosure, a word is not cut, but a unit having an appropriate length can be input into a speech to text (STT) model, and a more enhanced speech to text (STT) result text can be acquired.

Meanwhile, the effects of the present disclosure are not limited to the above-mentioned effects, and various effects can be included within the scope which is apparent to those skilled in the art from contents to be described below.

DETAILED DESCRIPTION

Figure 1:
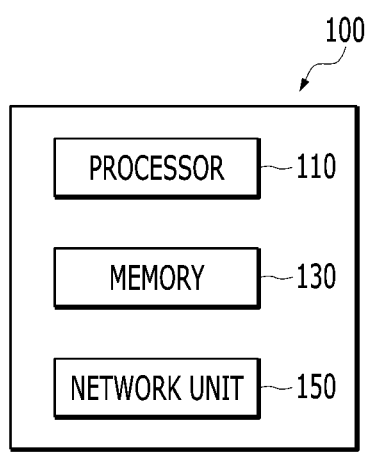
FIG. 1 is a block diagram of a computing device for detecting a speech segment according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for detecting a speech segment according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the processor 110 may process a length of a speech segment to a length appropriate for performing VAD smoothing or speech to text (STT) in a voice activity detection (VAD) process which is a technology that judges whether a voice activity is detected in an audio stream. More specifically, in general, a VAD pipeline performs a task of finally determining whether there is a voice in each frame with a probability value for a frame-specific voice of a VAD model, and since a frame unit is very short unlike a general classification model, it is not easy that a consecutive segment is made when discrimination is performed based on one threshold. Therefore, the processor 110 sets, as two thresholds, ① an Onset threshold (a threshold for entering a pronunciation segment) and ② an Offset threshold (a threshold for escaping from the pronunciation segment), and sets the Offset threshold to be lower than the Onset threshold to set the consecutive segment to be made.

That is, the processor 110 may judge that the speech segment is onset when a probability that the frame will be the voice is higher than the Onset threshold and judge that up to a just previous frame is the speech segment because the frame is not the speech segment when the probability is lower than the Offset threshold. Meanwhile, when a fixed Offset threshold is used, if a difference between the Offset threshold and the Onset threshold is basically large (i.e., the offset threshold is much smaller than the onset threshold), it is not easy to escape from the segment, so a very long speech segment of a VAD performing result may be made. Therefore, the processor 110 may detect an end point of the speech segment by utilizing the offset threshold which is dynamically changed based on the length of the speech segment (i.e., a length of the speech segment detected from a start point to a current judgment point), and as a result, it is possible to prevent the very long speech segment of the VAD performing result from being generated.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 110 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The network unit 150 according to an exemplary embodiment of the present disclosure may use an arbitrary type known wired/wireless communication systems.

Figure 2:
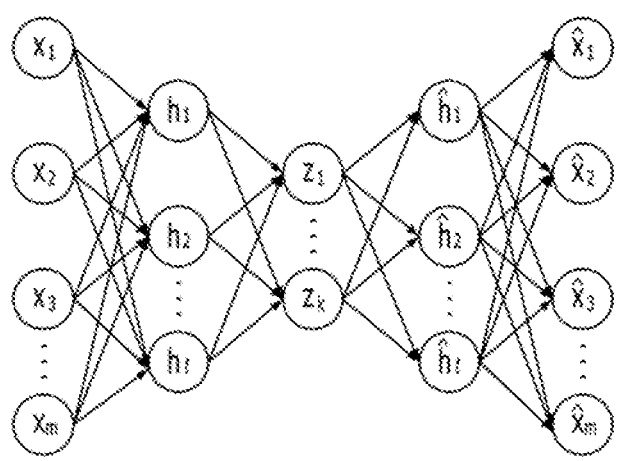
FIG. 2 is a schematic view illustrating a network function according to an exemplary embodiment of the present disclosure.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

According to an exemplary embodiment of the present disclosure, speech to text (STT or ASR) described below is a dictation technique that changes a speech to a text. An input of the speech to text (STT) may include at any one of a voice signal, a spectrogram into which the voice signal is converted, or a voice feature. Further, an output of the speech to text (STT) is a character string type text. A speech to text (STT) model may be divided into a modularized scheme and an end-to-end (e2e) scheme which is not modularized according to an implemented scheme. The modularized scheme may include an acoustic model (a model representing as which type the voice signal may be expressed), a language model (a model assigning a generation probability to a word based on a sentence and a word which are given), a traditional model (e.g., some models among Kaldi toolkit based ASRs, a Hybrid-ASR model, etc.) performing the voice recognition by dividing into the pronunciation dictionary, etc., but is not limited thereto. On the contrary, the scheme which is not modularized primarily means an e2e model (e.g., a transformer-based encoder decoder model, etc.), and the model may be generated by training a lot of data without a sub module. Meanwhile, as a decoding technique, a beam search technique is representative, and the beam search technique is a method that does not predict only one word closest a correct answer according to a situation, but finds a most optimal correct answer by considering an entire sentence by opening various possibilities.

Voice activity detection (VAD) according to an exemplary embodiment of the present disclosure is a technique that judges whether a voice activity is detected from an audio stream. Preprocessing techniques such as noise removal and speech enhancement may be applied to the voice activity detection (VAD) before the speech to text (STT) is applied. Further, the voice activity detection (VAD) may discriminate whether the speech segment by various schemes based on a binary classification algorithm that distinguishes whether a person pronounces every short speech segment (e.g., 0.01 s) (1) and whether the short speech segment is not a part which the person pronounces (0). Further, in the voice activity detection (VAD), a probability distribution based classification algorithm which has a distribution of spoken speeches and a distribution of noise speeches, and discriminates to which of both the speech and the noise the voice is closer through a statistical ground may be primarily used, but the voice activity detection (VAD) is not limited thereto.

The smoothing after the VAD according to an exemplary embodiment of the present disclosure is a task of detecting a segment including the speech through the VAD, and then adjusting the corresponding speech segment to a unit to excellently perform the speech to text (STT). For example, when the speech to text (STT) is performed by a too short or too long unit, a proper result may not be output. Therefore, it is necessary to perform the speech to text (STT) by making the speech segment into a unit (e.g., 15 seconds) which is not too short and not too long, and this process is smoothing after the voice activity detection (VAD). Meanwhile, when even one word is cut at the time of determining the unit of performing the speech to text (STT), performance of performing the speech to text (STT) may deteriorate, as a result, in the smoothing after the voice activity detection (VAD) according to an exemplary embodiment of the present disclosure, a word-boundary detection technique may also be utilized jointly.

Figure 3:
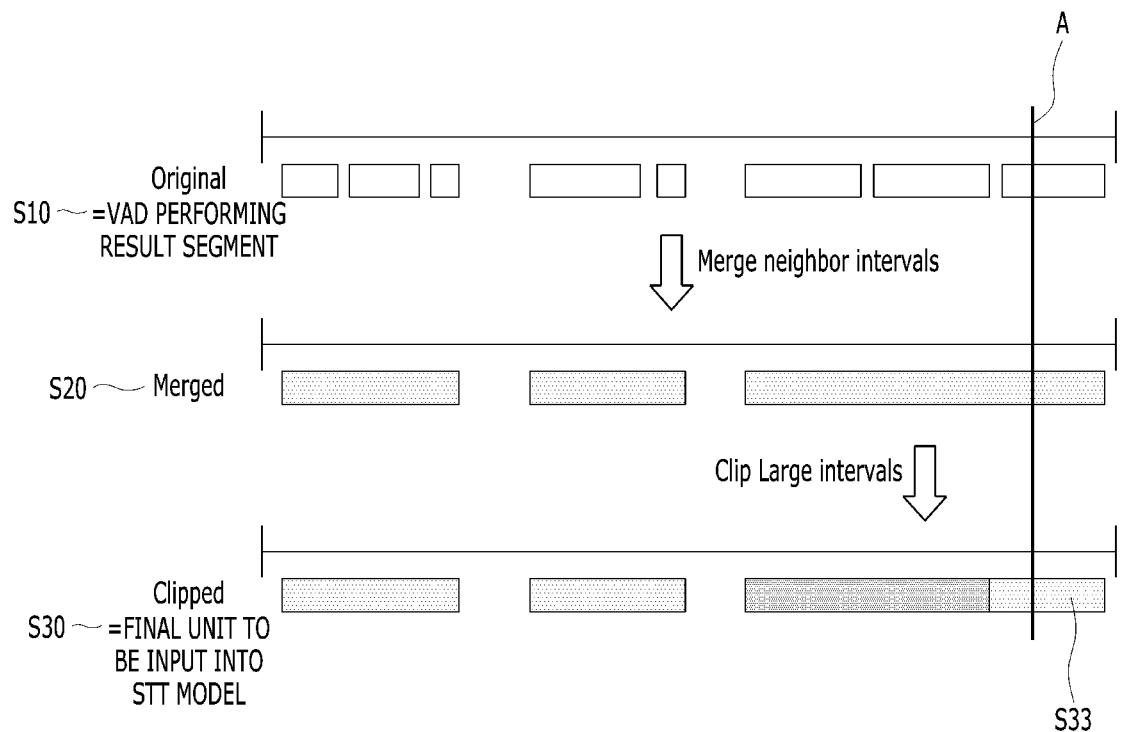
FIG. 3 is a diagram illustrating an example of clipping a long speech segment during a smoothing task for speech to text (STT) after voice activity detection (VAD) according to an exemplary embodiment of the present disclosure.
Figure 4:
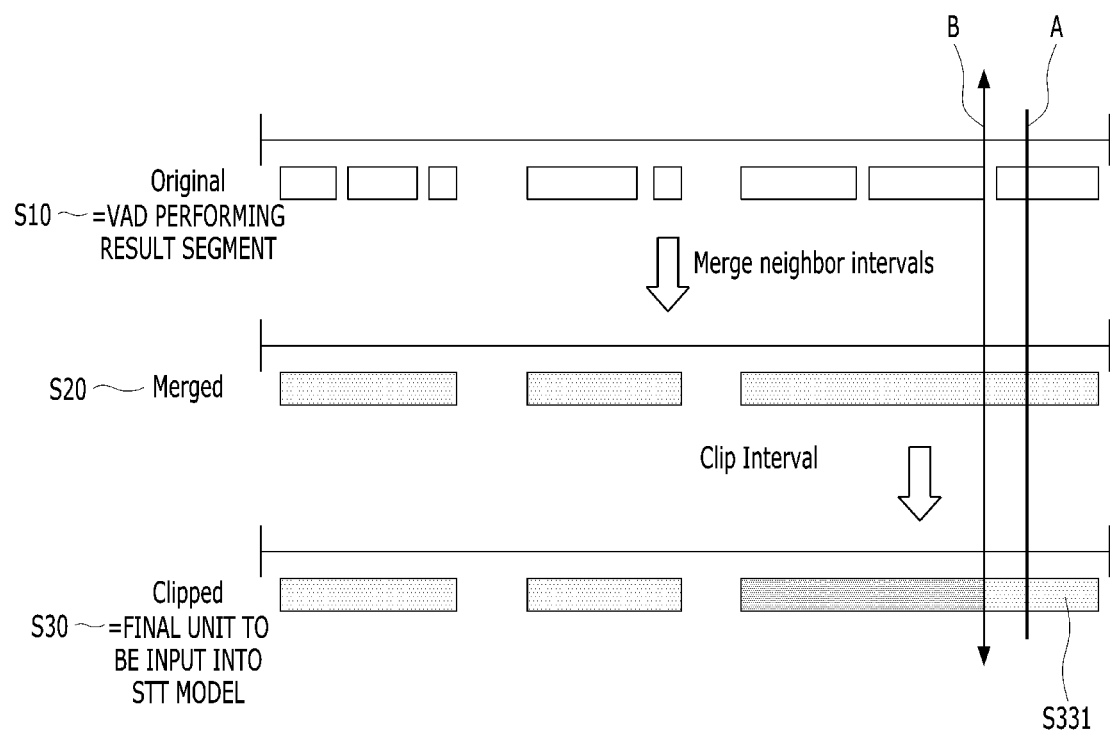
FIG. 4 is a diagram illustrating an example of preserving and clipping a boundary of a word in the process of clipping a merged speech segment according to an exemplary embodiment of the present disclosure.
Figure 5:
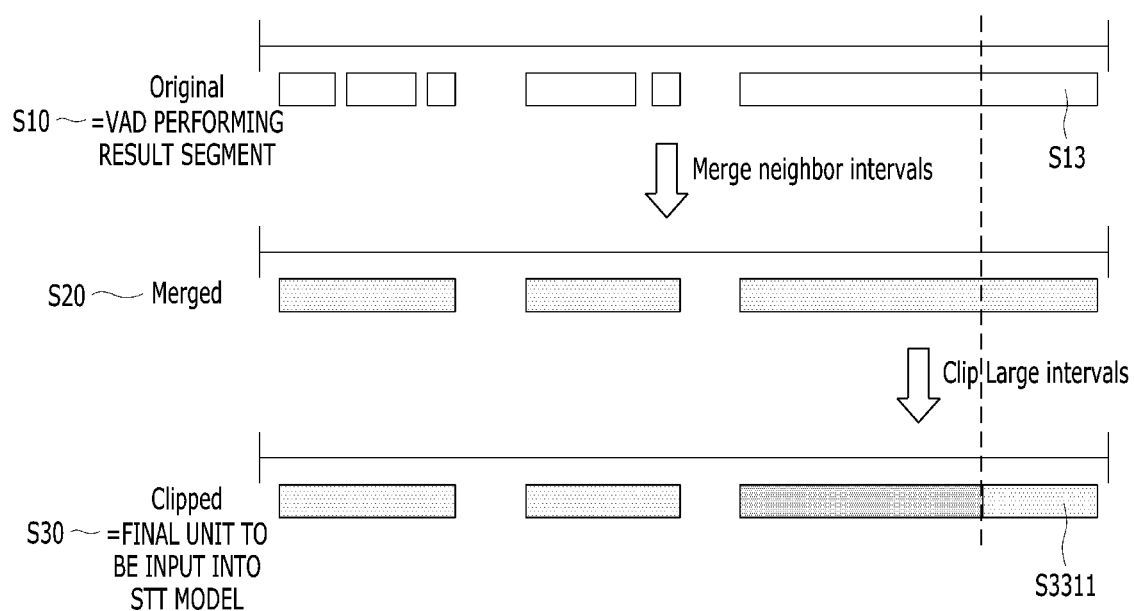
FIG. 5 is a diagram illustrating an example in which when an original VAD segment itself is long, appropriate clipping is impossible according to an exemplary embodiment of the present disclosure.

FIG. 3 is a diagram illustrating an example of clipping a long speech segment during a smoothing task for speech to text (STT) after voice activity detection (VAD) according to an exemplary embodiment of the present disclosure, FIG. 4 is a diagram illustrating an example of preserving and clipping a boundary of a word in the process of clipping a merged speech segment according to an exemplary embodiment of the present disclosure, and FIG. 5 is a diagram illustrating an example in which when an original VAD segment itself is long, appropriate clipping is impossible according to an exemplary embodiment of the present disclosure.

According to an exemplary embodiment of the present disclosure, in the voice activity detection (VAD) or the smoothing for the speech to text (STT) after the voice activity detection (VAD), a process of merging both speech segments when an interval between the speech segment and an adjacent speech segment is short and clipping both speech segments when one speech segment is too long. For example, referring to FIGS. 3 to 5, the voice activity detection (VAD) or smoothing step for the speech to text (STT) after the voice activity detection (VAD) may include a voice activity detection step S10, a merge step S20, and a clip step S30.

First in step S10, as a step of performing original VAD, it may be discriminated whether the speech segment by various schemes based on a binary classification algorithm that distinguishes whether a person pronounces every short speech segment (e.g., 0.01 s) (1) and whether the short speech segment is not a part which the person pronounces (0). In step S20, as a step of merging, when the interval between the speech segment and the adjacent speech segment is short, some of a plurality of detected speech segments may be merged. In step S30, as a clip step, when a length of the merged speech segment is more than a clip-reference threshold, the merged speech segment may be clipped.

However, when the merged speech segment is clipped based on a fixed first reference line A (e.g., 15 seconds) as illustrated in FIG. 3, the merged speech segment is clipped even in the middle of speaking one word at the time of clipping the speech segment, so a problem in that speech to text (STT) performance deteriorates may occur. For example, referring to a third unit (S33) in step S30 of FIG. 3, the speech segment is clipped based on the first reference line A even in the middle of speaking one word in the original VAD, so the performance may deteriorate at the time of performing the speech to text (STT). In order to solve this, the processor 110 may perform word-boundary preserved clipping after identifying a word boundary.

According to an exemplary embodiment of the present disclosure, under the assumption that the word boundary is well detected in step S10 (original VAD), a word-boundary preserved clipping operation may be performed as illustrated in FIG. 4. Referring to a third unit (S331) of step S30 in FIG. 4, clipping may be performed by determining a second reference line B of the original VAD segment closest to a predetermined time (e.g., 15 seconds) as a clip point like the first reference line A of FIG. 3.

Meanwhile, when an original VAD segment itself is very long, there is a problem in that an appropriate clip point may not be found in relation to the word-boundary preserved clipping. For example, referring to FIG. 5, when length the voice activity detection (VAD) segment itself is long like a third unit (S13) in step S10, if the merged speech segment is clipped again based on a specific point which allows the speech to text (STT) to have an appropriate length after merging the speech segments, there may be a problem in that it is difficult to find the boundary of the original VAD segment close to the specific point. That is, the length of S13 which is a VAD performing result segment unit is too long in the process of proceeding to step S30 from step S20, so it may be difficult to find an appropriate clip point (e.g., a point where the word boundary is preserved like the second reference line B of FIG. 4) of a unit S3311.

According to an exemplary embodiment of the present disclosure, the processor 110 may improve the speech to text (STT) performance by adjusting the segment to an appropriate length for the speech to text (STT) in a voice activity detection (VAD) process or a smoothing process after the voice activity detection (VAD) in order to the problems described through FIGS. 3 to 5 above. Further, the processor 110 sets, as two thresholds, ① an Onset threshold (a threshold for entering a pronunciation segment) and ② an Offset threshold (a threshold for escaping from the pronunciation), and sets the Offset threshold to be lower than the Onset threshold to set the consecutive segment to be made. Further, the processor 110 may judge that the speech segment is onset when a probability that the frame will be the voice is higher than the Onset threshold and judge that up to a just previous frame is the speech segment because the frame is not the speech segment when the probability is lower than the Offset threshold. Additionally, the processor 110 may dynamically adjust the offset threshold according to a speech segment length (i.e., a length of a speech segment detected from a start point to a current judgment point) in the voice activity detection (VAD) step in order to prevent a problem situation illustrated in FIG. 5 from occurring. That is, the processor 110 may improve the speech to text (STT) performance by adaptively adjusting the offset threshold related to speech segment judgment so as to "generate a speech segment (the original VAD segment in step S10 of FIGS. 3 and 4 described above, "VAD performing result segment") having an appropriate length when performing the voice activity detection (VAD)".

First, the processor 110 may acquire an audio signal before detecting the speech segment. For example, the audio signal may include the voice signal or the spectrogram. Further, the audio signal may include a speaker voice. Meanwhile, the processor 110 may perform preprocessing such as noise removal and speech enhancement for quality enhancement before detecting the start point of the speech segment in the audio signal.

According to an exemplary embodiment of the present disclosure, the processor 110 may detect the start point of the speech segment in the audio signal. Further, when a probability that a specific frame of the audio signal corresponds to the speech is more than the onset threshold, the processor 110 may determine the specific frame as the start point. In other words, when the probability that the specific frame of the audio signal is the speech will be more than "the onset threshold for judging entering the speech segment", the processor 110 may judge the specific frame as the speech segment and determine the specific frame as the start point (start frame) of the speech segment. For example, referring to FIG. 6, when a probability that a first frame will correspond to the speech is 0.1, a probability that a second frame will correspond to the speech is 0.8, a probability that a third frame will correspond to the speech is 0.9, a probability that a fourth frame will correspond to the speech is 0.7, a probability that a fifth frame will correspond to the speech is 0.6, and the onset threshold is 0.75, the processor 110 may determine, as the start point, the second frame which is a case where the probability that the specific frame will correspond to the speech is more than the onset threshold.

According to an exemplary embodiment of the present disclosure, the processor 110 may detect the end point of the speech segment based on the offset threshold. For example, when a probability that a specific subsequent frame among subsequent frames which enter continuously after the determined start point will be the speech is lower than the "offset threshold for judging escaping from the speech segment", the processor 110 may judge that the corresponding frame is not the speech segment and determine that a just previous subsequent frame of the specific subsequent frame is an end frame of the speech segment. In this case, the offset threshold may be smaller than the onset threshold. Further, the continuous segment may be lengthened as the offset threshold is set to be lower than the onset threshold. More specifically, the processor 110 may calculate probabilities that the subsequent frames after the specific frame will correspond to the speech. For example, referring to FIG. 6, the processor 110 may calculate probabilities that respective subsequent frames (third to fifth frames) after the second frame determined as the start point will correspond to the speech. Further, when the probability that the specific subsequent frame will correspond to the speech is lower than the offset threshold, the processor 110 may determine the just previous frame of the specific subsequent frame as the end point. For example, referring to FIG. 6, when a probability that the second frame determined as the start point will correspond to the speech is 0.8, a probability that the third frame will correspond to the speech is 0.9, a probability that the fourth frame will correspond to the speech is 0.7, a probability that the fifth frame will correspond to the speech is 0.6, and the offset threshold is 0.73, the processor 110 may determine, as the end point, the third frame which is the just previous frame of the fourth frame in which the probability that the specific frame will correspond to the speech is lower than the offset threshold.

According to an exemplary embodiment of the present disclosure, the offset threshold may be implemented as an offset threshold which is dynamically changed. Further, the dynamically changed offset threshold may be based on the length of the speech segment. As an example, the length of the speech segment may be a segment generated by accumulating a plurality of frames. For example, the processor 110 as the length of the speech segment increases, that is, a frame is generated after a start frame determined as the start point, the "offset threshold for judging escaping from the speech segment; may be set to be higher with respect to the corresponding frame. In other words, the dynamically changed offset threshold may be dynamically changed based on the number of frames between the start point and a judgment target point. As an example, the judgment target point may be related to each of the subsequent frames accumulated after the start point. Further, the dynamically changed offset threshold may increase in proportion to the number of frames between the start point and the judgment target point. Meanwhile, the processor 110 dynamically changes the offset threshold based on the length of the speech segment by such a scheme to prevent a long segment which makes word-boundary preservation clipping difficult during the original VAD as illustrated in FIG. 5.

According to an exemplary embodiment of the present disclosure, the processor 110 may perform smoothing of detecting a plurality of speech segments in the audio signal by considering two thresholds described above, merging a short portion between the speech segments, and clipping a long portion between the speech segments based on an appropriate length.

First, the processor 110 may detect the plurality of speech segments in the audio signal, and merge some of the plurality of detected speech segments. More specifically, the processor 110 may calculate intervals among the plurality of detected speech segments. For example, the processor 110 may calculate the intervals among the plurality of speech segments detected in step S10 of FIGS. 3 to 5. Further, the processor 110 may identify an interval which is less than a merge-reference threshold among the calculated intervals. Further, the processor 110 may merge speech segments associated with the identified interval. In other words, the processor 110 may merge the speech segments when the interval between the speech segment and the adjacent speech segment is short. For example, the processor 110 may merge some of the plurality of speech segments detected in step S10 like step S20.

When a length of the merged speech segment is more than a clip-reference threshold, the processor 110 may clip the merged speech segment again. Here, the clip-reference threshold may be determined based on an input unit of the speech to text (STT) model. As an example, the input unit of the STT model may include a predetermined time unit such as 15 s (e.g., when the frame is defined as 0.01 s, 1500 frames). More specifically, the processor 110 may identify boundaries of original speech segments before merging with respect to the merged speech segment. Further, the processor 110 may clip the merged speech segment again based on one boundary of the identified boundaries of the original speech segments. For example, referring to FIG. 4, the processor 110 may identify the boundaries of the original speech segments before merging, i.e., the segments in step S10. Further, the processor 110 may clip the merged speech segment by determining the second reference line B as the clip point based on one boundary of the identified boundaries of the original speech segments.

Figure 6:
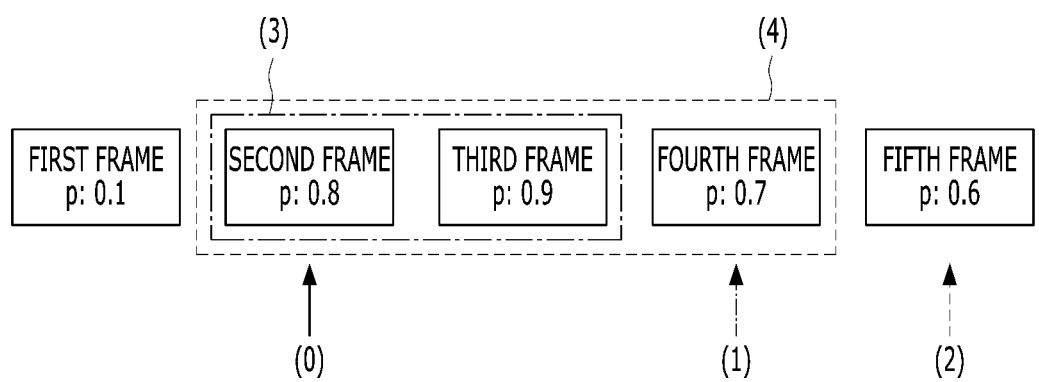
FIG. 6 is a diagram schematically illustrating an exemplary embodiment of performing voice activity detection (VAD) according to an exemplary embodiment of the present disclosure.

FIG. 6 is a diagram schematically illustrating an exemplary embodiment of performing voice activity detection (VAD) according to an exemplary embodiment of the present disclosure.

According to an exemplary embodiment of the present disclosure, p illustrated in FIG. 6 may be a value representing a probability that each frame will include the speech by the neural network model of the processor 110. In this case, p may be a value between 0 and 1. In FIG. 6, two cases of the offset threshold will be described. The onset threshold may be fixed to 0.75 in two cases of the offset threshold. However, 0.75 which is the value of the onset threshold is just an example, and may be variously determined. Two offset threshold cases may include ① a first case in which the offset threshold is fixed to 0.65 and ② a second case in which the offset threshold is dynamically converted for subsequent frames after the start frame. Meanwhile, when the voice activity detection (VAD) is intended to be performed by the unit of the word, the speech segment should appear comparatively more frequently than the case of performing the voice activity detection (VAD) by the unit of the sentence, so the onset threshold may be set to be lower than that in the case of performing the VAD by the unit of the sentence.

According to an exemplary embodiment of the present disclosure, the processor 110 may judge whether the probability that each frame acquired in time series will correspond to the speech is more than the onset threshold. Since the probability that the second frame will correspond to the speech is 0.8 and the onset threshold is 0.75, the processor 110 may detect the second frame as entering of the speech segment, i.e., the start point of the speech segment (⓪). Since the onset threshold is 0.75 in both two cases, p=0.8>0.75 in the second frame in both two cases, so it may be judged that the second frame is the entering of the speech segment.

Next, the processor 110 may detect the end point of the speech segment based on the offset threshold in each case. First, in ① the first case in which the offset threshold is fixed to 0.65, a fifth frame may be judged as escaping from the speech segment of the corresponding case (②). That is, when a probability that a specific subsequent frame (e.g., the fifth frame) will correspond to the speech is lower than the offset threshold (e.g., 0.65), the processor 110 may determine a just previous frame (e.g., a fourth frame) of the specific subsequent frame (e.g., the fifth frame) as the end point. Further, the processor 110 may determine a segment in which the second to fourth frames are merged as a VAD result segment of the first case (④).

In the second case in which the offset threshold is dynamically changed, the processor 110 may dynamically change the offset threshold by considering the subsequent frames after the start frame. In this case, as the number of frames accumulated after the start frame increases, i.e. as the length of the speech segment increases after the start frame, the processor 110 may dynamically change the offset threshold based on the number of frames between the start point and the judgment target point. For example, the processor 110 may change the offset threshold to 0.67, 0.71, 0.73, etc., to increase in proportion to the number of frames between the start point and the judgment target point by considering the increase in length of the speech segment (the number of frames). In this case, the offset threshold may be changed under a condition of maintaining a smaller value than the onset threshold. In other words, the offset threshold may be changed under a condition of maintaining a smaller value than 0.75 which is the onset threshold. However, the offset threshold just maintains a smaller value than the onset threshold so as to prevent a too short speech segment form being generated, according to an exemplary embodiment, the offset threshold may also have a higher value than the onset threshold. For example, when a too long speech segment is generated, the offset threshold may be set to be higher than the onset threshold. Meanwhile, the processor 110 may detect whether the fourth frame corresponds to the end point of the speech segment based on 0.73 which is the dynamically changed offset threshold. In this case, when the probability that the fourth frame will correspond to the speech is lower than 0.73 which is the offset threshold, the processor 110 may determine the third framed which is the just previous frame of the fourth frame as the end point. Further, the processor 110 may determine a segment in which the second and third frames are merged as a VAD result segment of the second case (3). That is, the processor 110 may determine a segment which is shorter than the first case in which the offset threshold is fixed as the VAD result segment.

According to an exemplary embodiment of the present disclosure, the processor 110 may dynamically change the offset threshold according to the length of the speech segment in a situation in which the onset threshold is fixed. The processor 110 dynamically changes the offset threshold based on the length of the speech segment by such a scheme to prevent a long segment which makes word-boundary preservation clipping difficult from being generated during the original VAD as illustrated in FIG. 5.

Figure 7:
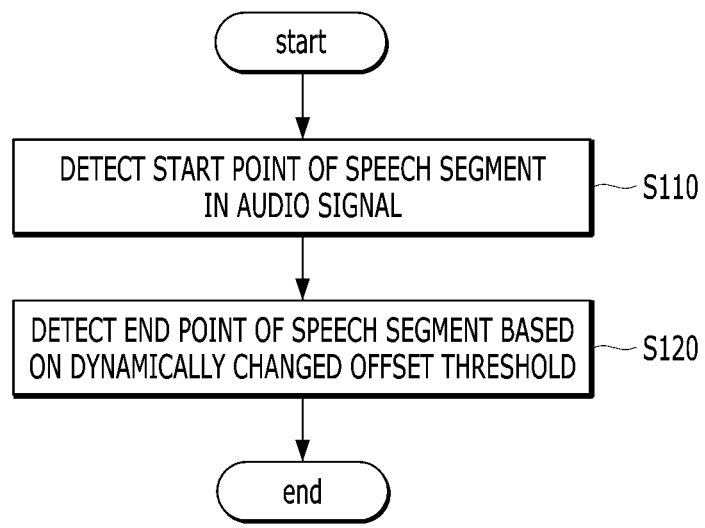
FIG. 7 is a flowchart for a method for detecting a speech segment according to an exemplary embodiment of the present disclosure.

FIG. 7 is a flowchart for a method for detecting a speech segment according to an exemplary embodiment of the present disclosure.

The method for detecting a speech segment illustrated in FIG. 7 may be performed by the computing device 100 described above. Although not mentioned below in detail, the contents described may also be similarly applied to the description of the method for detecting a speech segment by the computing device 100.

Referring to FIG. 7, the method for detecting a speech segment according to an exemplary embodiment of the present disclosure may include: a step (S110) of detecting a start point of a speech segment in an audio signal; and a step (S120) of detecting an end point of the speech segment based on an offset threshold which is dynamically changed, and the dynamically changed offset threshold may be based on a length of the speech segment. The method may include various steps in addition to the steps. Further, the method for detecting a speech segment according to an exemplary embodiment of the present disclosure may be performed by a computing device 100.

Step S110 above is the step of detecting the start point of the speech segment in the audio signal. Step S110 above may include a step of determining, when a probability that a specific frame of the audio signal will correspond to a speech is more than an onset threshold, the specific frame as the start point. For example, the step of detecting the start point of the speech segment in the audio signal may include a step of determining, when a probability that a specific frame of the audio signal will correspond to a speech is more than an onset threshold, the specific frame as the start point. Here, the dynamically changed offset threshold may be smaller than the onset threshold. Further, the detecting of the end point of the speech segment may include a step of calculating probabilities that subsequent frames after the specific frame will correspond to the speech, and when the probability that the specific subsequent frame will correspond to the speech is lower than the offset threshold, a step of determining a just previous frame of the specific subsequent frame as the end point.

Step S120 above is a step of detecting an end point of the speech segment based on an offset threshold which is dynamically changed. The dynamically changed offset threshold may be based on the length of the speech segment. Step S120 above may be changed based on the number of frames between the start point and a judgment target point. Step S120 above may increase in proportion to the number of frames between the start point and the judgment target point.

Meanwhile, the method according to an exemplary embodiment of the present disclosure may further include a step of detecting a plurality of speech segments in the audio signal, and merging some of the plurality of detected speech segments in addition to steps S110 and S120. Further, the merging of some of the plurality of detected speech segments may include a step of calculating intervals among the plurality of detected speech segments, a step of identifying an interval of the calculated intervals, which is less than a merge-reference threshold, and a step of merging speech segments associated with the identified interval.

The method according to an exemplary embodiment of the present disclosure may further include clipping the merged speech segment when a length of the merged speech segment is more than a clip-reference threshold in addition to steps S110 and S120. The clipping of the merged speech segment may include a step of identifying a boundary of original speech segments before merging with respect to the merged speech segment, and a step of clipping the merged speech segment based on one boundary among the boundaries of the identified original speech segments. Here, the clip-reference threshold may be determined based on an input unit of the speech to text (STT) model.

The steps mentioned in the above description may be further divided into additional steps or combined into fewer steps, according to an embodiment of the present disclosure. In addition, some steps may be omitted as necessary, and the order between the steps may be changed.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 8:
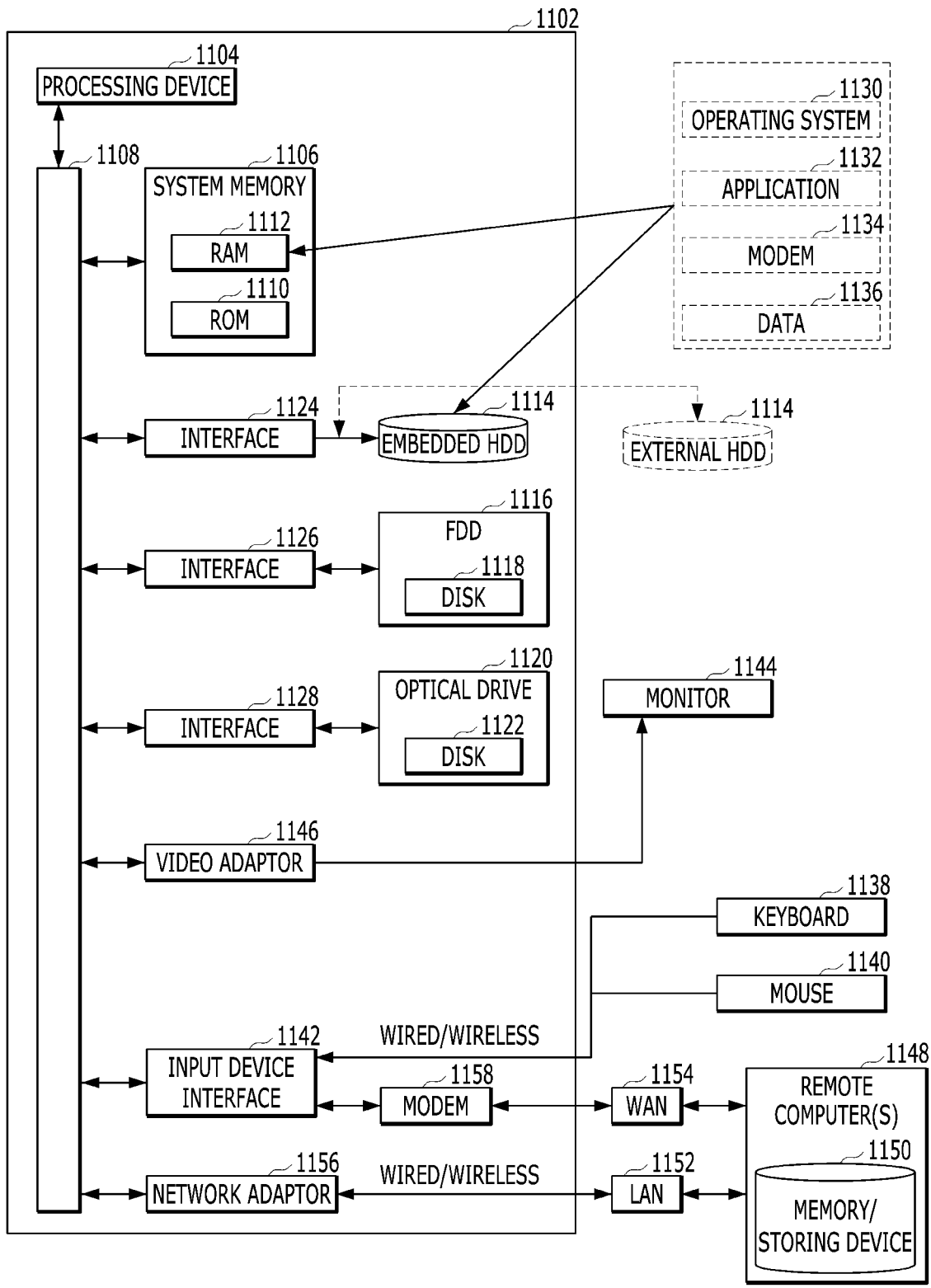
FIG. 8 is a simple and normal schematic view of an exemplary computing environment in which exemplary embodiments of the present disclosure may be implemented

FIG. 8 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method for detecting a speech segment, the method performed by a computing device including at least one processor, the method comprising:
    detecting a start point of a speech segment in an audio signal, wherein the audio signal comprises a plurality of frames, wherein each frame of the plurality of frames is a defined temporal length, and wherein the start point corresponds to a start frame, of the plurality of frames, of the speech segment;
    setting an offset threshold;
    dynamically changing the offset threshold to increase in proportion to a number of frames of the plurality of frames between the start frame and a judgment target point;
    detecting an end point of the speech segment based on the offset threshold which was dynamically changed, such that the speech segment has a length; and
    performing voice activity detecting (VAD) by inputting the speech segment having the length into a speech to text (STT) model, wherein the STT model outputs textual content based on the speech segment having the length.

2. The method of claim 1, wherein the detecting of the start point of the speech segment includes determining, when a probability that the start frame of the audio signal corresponds to speech is higher than an onset threshold, the start frame as the start point.

3. The method of claim 2, wherein the dynamically changed offset threshold is smaller than the onset threshold.

4. The method of claim 2, wherein the detecting of the end point of the speech segment includes:
    calculating probabilities that subsequent frames after the start frame correspond to speech, and
    when a probability of the probabilities that a specific subsequent frame corresponds to speech is lower than the offset threshold, determining a just previous frame of the specific subsequent frame as the end point.

5. The method of claim 1, further comprising:
    detecting a plurality of speech segments in the audio signal based on the start point and the end point, and merging some of the plurality of detected speech segments.

6. The method of claim 5, wherein the merging of some of the plurality of detected speech segments includes:
    calculating intervals among the plurality of detected speech segments,
    identifying an interval of the calculated intervals, which is less than a merge-reference threshold, and
    merging speech segments associated with the identified interval.

7. The method of claim 5, further comprising:
    clipping the merged speech segment when a length of the merged speech segment is more than a clip-reference threshold.

8. The method of claim 7, wherein the clipping of the merged speech segment includes:
    identifying boundaries of original speech segments before merging with respect to the merged speech segment, and
    clipping the merged speech segment based on one boundary among the boundaries of the identified original speech segments.

9. The method of claim 7, wherein the clip-reference threshold is determined based on an input unit of the speech to text (STT) model.

10. A computer program stored in a non-transitory computer-readable storage medium, wherein the computer program causes one or more processors to execute operations for detecting a speech segment, the operations comprising:
    detecting a start point of a speech segment in an audio signal, wherein the audio signal comprises a plurality of frames, wherein each frame of the plurality of frames is a defined temporal length, and wherein the start point corresponds to a start frame, of the plurality of frames, of the speech segment;
    setting an offset threshold;
    dynamically changing the offset threshold to increase in proportion to a number of frames of the plurality of frames between the start frame and a judgment target point;
    detecting an end point of the speech segment based on the offset threshold which was dynamically changed, such that the speech segment has a length; and
    performing voice activity detecting (VAD) by inputting the speech segment having the length into a speech to text (STT) model, wherein the STT model outputs textual content based on the speech segment having the length.

11. A computing device comprising:
    at least one processor; and
    a memory,
    wherein at least one processor is configured to:
        detect a start point of a speech segment in an audio signal, wherein the audio signal comprises a plurality of frames, wherein each frame of the plurality of frames is a defined temporal length, and wherein the start point corresponds to a start frame, of the plurality of frames, of the speech segment,
set an offset threshold,
dynamically change the offset threshold to increase in proportion to a number of frames of the plurality of frames between the start frame and a judgment target point,
detect an end point of the speech segment based on the offset threshold which was dynamically changed, such that the speech segment has a length, and
perform voice activity detecting (VAD) by inputting the speech segment having the length into a speech to text (STT) model, wherein the STT model outputs textual content based on the speech segment having the length.

* * * * *